United States Patent
Furr

(10) Patent No.: US 6,511,193 B1
(45) Date of Patent: Jan. 28, 2003

(54) SAFETY REFLECTOR FOR VEHICLES

(76) Inventor: Carol A. Furr, 1696 Sanders Rd., Windsor, CA (US) 95492

( * ) Notice: Subject to any disclaimer, the term of this patent is extended or adjusted under 35 U.S.C. 154(b) by 0 days.

(21) Appl. No.: 09/894,945

(22) Filed: Jun. 28, 2001

Related U.S. Application Data

(60) Provisional application No. 60/214,660, filed on Jun. 28, 2000.

(51) Int. Cl.$^7$ ................................................. G02B 7/182
(52) U.S. Cl. ...................... 359/882; 359/883; 359/881; 359/880
(58) Field of Search ................... 359/882, 883, 359/881, 880, 879; 40/591, 592, 599, 600, 606, 623

(56) References Cited

U.S. PATENT DOCUMENTS

| | | | |
|---|---|---|---|
| 4,123,853 A | * 11/1978 | Dickensheet | 35/77 |
| 4,605,292 A | * 8/1986 | McIntosh | 350/641 |
| 4,663,874 A | * 5/1987 | Sano et al. | 40/621 |
| 4,751,494 A | * 6/1988 | Crotwell | 340/473 |
| 5,388,546 A | * 2/1995 | Lombard | 116/209 |
| 5,768,041 A | * 6/1998 | Rudolph | 359/872 |

* cited by examiner

*Primary Examiner*—Mohammad Sikder
(74) *Attorney, Agent, or Firm*—Larry D. Johnson; Craig M. Stainbrook; Johnson & Stainbrook

(57) ABSTRACT

A small panel member of flexible, magnetized sheet material with a front surface at least partially covered with highly reflective material, and a back surface including an adhesive strip. The apparatus may be stored in a vehicle until needed, and placed on the front, rear or sides of a vehicle by applying the magnetized panel to a metallic surface. Alternatively, the adhesive strip may be used to affix the panel to a non-magnetic surface on the vehicle. A short length of cable is connected to the panel and terminates in an anchor, so that when the panel is affixed to the outside of the vehicle, the cable can be passed through the jamb gap between the trunk lid and body, or door and door jamb, with the block locked inside the trunk or passenger compartment, effectively locking the panel to the vehicle to prevent displacement or theft. A clip element is connected to the cable to permit the cable to be looped and secured around a structure in the trunk or passenger compartment, to further mechanically secure the cable inside the vehicle.

4 Claims, 1 Drawing Sheet

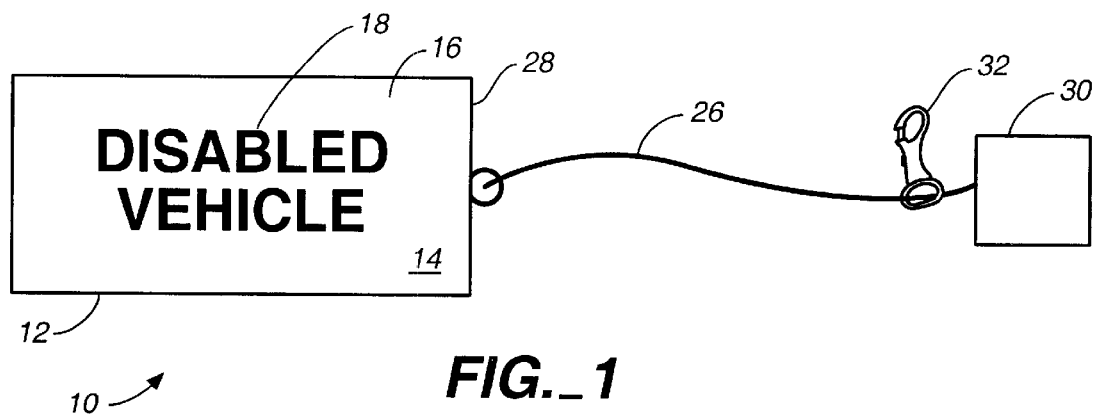
*FIG._1*
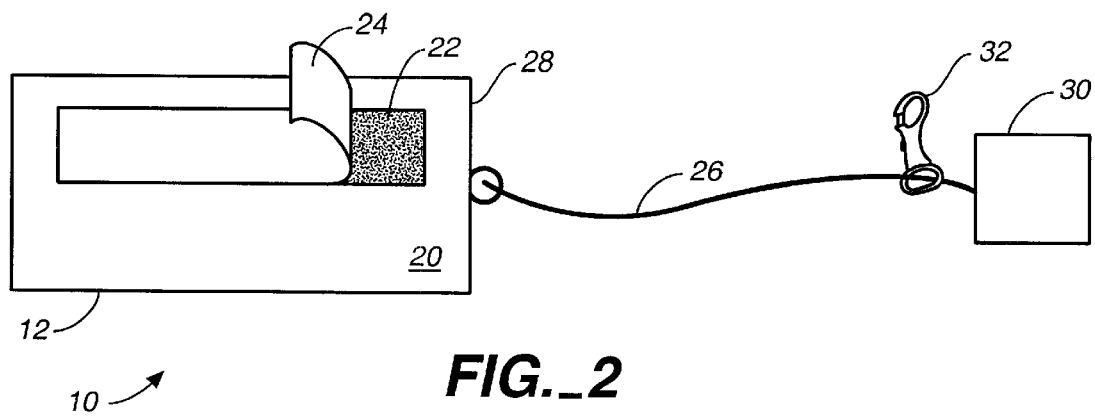
*FIG._2*

SAFETY REFLECTOR FOR VEHICLES

CROSS REFERENCE TO RELATED APPLICATIONS

The present application claims the benefit of the filing date of U.S. Provisional Application Ser. No. 60/214,660, filed Jun. 28, 2000.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to signs, displays, and warning devices, and more specifically to an improved safety reflector apparatus for temporary and releasable attachment to the outside of a disabled vehicle, to increase the vehicle's visibility to approaching traffic, and to request assistance.

BACKGROUND INFORMATION/DISCUSSION OF RELATED ART INCLUDING INFORMATION DISCLOSED UNDER 37 CFR 1.97 AND 37 CFR 1.98

When a car, truck, or other vehicle breaks down or is otherwise forced to be left on or near a roadway, it is desirable to alert approaching drivers, both to warn them of the presence of the disabled vehicle to avoid a collision, as well as to request assistance when appropriate. Numerous products have been developed to indicate that a vehicle is disabled, or to otherwise draw attention to the vehicle. For example, Carroll et al. U.S. Pat. No. 3,670,438 teaches an auto travel trouble sign with raised luminescent lettering conveying distress information, with a magnetic strip for temporary attachment to the exterior of a vehicle. Sano et al. U.S. Pat. No. 4,663,874 describes a flexible magnetic sign which may be detachably mounted on a body panel of a motor vehicle. Williams, Jr. et al discloses an automobile emergency signaling apparatus with a variety of signs visible through a transparent envelope, which is then mounted to the automobile with a magnetic strip. O'Connell et al. U.S. Pat. No. 5,224,439 provides a light-reflective warning arrow and mount for automotive vehicles, which may be magnetically secured to the vehicle. Darago U.S. Pat. No. 5,226,792 teaches a distress flag for placement in an automobile window. Fogelman U.S. Pat. No. 5,263,272 describes a highway emergency safety sign made up of a plurality of slats with warning indicia, with magnets for attachment to a vehicle. Lombard U.S. Pat. No. 5,388,546 discloses an automobile locator device in the form of a magnetic base attachable to a vehicle roof, a mast extending upwardly from the base, and a pennant extending laterally from the mast. Finally, Bump, Jr. et al. provides a safety banner bearing a warning symbol, with a magnet embedded in the material to enable attachment to a vehicle. However, these known devices are limited in their ability to be placed anywhere on the vehicle, and/or are prone to theft.

BRIEF SUMMARY OF THE INVENTION

The safety reflector for vehicles of this invention provides a small panel member (e.g., six inches by twenty four inches) of flexible, magnetized sheet material such as is typically used for magnetic signs. The front surface of the panel member is preferably at least partially covered with highly reflective material which may be in the form of a pattern, or even indicia or words such as "Disabled Vehicle". The back surface of the panel member includes an adhesive strip, preferably with a removable covering. The inventive apparatus may be stored in a vehicle passenger compartment or trunk, and placed on the front, rear or sides of a vehicle by applying the magnetized panel member to a metallic surface such as the trunk lid, hood, or door. Alternatively, the adhesive strip may be used to affix the panel member to a non-magnetic surface on the vehicle, such as a window or plastic body component. The panel member can be selectively placed and oriented so as to present the front surface reflective material towards the direction of traffic and increase the visibility of the disabled vehicle to passing motorist. A short length of cable (e.g., three feet) is connected to an edge of the panel member and terminates in an anchor, block or other over-sized element, so that when the panel member is affixed to the outside of the vehicle, the cable can be passed through the jamb gap between the trunk lid and body, or door and door jamb, with the block locked inside the trunk or passenger compartment, effectively locking the panel member to the vehicle to prevent displacement or theft. A clip or hook element is connected to the cable to permit the cable to be looped and secured around a structure in the trunk or passenger compartment, e.g., a hinge, strut, or door handle, to mechanically secure the cable inside the vehicle, as an alternative or additional way to prevent displacement or theft of the device.

BRIEF DESCRIPTION OF THE SEVERAL VIEWS OF THE DRAWINGS

FIG. 1 is a front elevation view of a safety reflector for vehicle of this invention, illustrating the front surface of the panel member; and FIG. 2 is a rear elevation view of the safety reflector of FIG. 1, illustrating the back surface of the panel member.

DETAILED DESCRIPTION OF THE INVENTION

Referring to FIGS. 1 and 2, wherein like reference numerals refer to like components in both views, FIG. 1 is a front elevation view of a safety reflector 10 of this invention, while FIG. 2 is a rear elevation view. Safety reflector 10 includes a small sign or panel member 12 constructed of magnetic material and preferably flexible, magnetized sheet material, so as to be able to conform to non-planar metal surfaces. The front surface 14 of the panel member is preferably at least partially covered with highly reflective material 16 such as reflective paint or foil which may be in the form of a pattern, indicia or words 18. The back surface 20 of the panel member includes an adhesive strip 22, preferably with a removable or peel-away covering 24. A short length of cable or strap 26 is connected to an edge 28 of the panel member 12, and terminates in an anchor (over-sized element or enlargement) 30, so that when the panel member 12 is affixed to the outside of the vehicle, cable 26 can be passed through the gap in the door jamb or trunk lid jamb, with the anchor 30 locked inside the trunk or passenger compartment, effectively locking the panel member 12 to the vehicle. A clip or hook element 32 is connected to the cable 26 to permit the cable to be looped and secured around a structure in the trunk or passenger compartment, e.g., a hinge, strut, or door handle, to mechanically secure the cable 26 inside the vehicle, as an alternative or additional way to prevent displacement or theft of the device.

Thus, the inventive apparatus may be placed on the front, rear or sides of a vehicle by applying the magnetized panel member 12 to a metallic surface such as the trunk lid, hood, or door. Alternatively, the panel member may be affixed to a non-magnetic surface on the vehicle, such as a window or plastic body component by use of the adhesive strip 22 on the rear surface of the panel member. The panel member can be secured to the vehicle by use of the anchoring characteristics of the over-sized block anchor or block member 30 within the vehicle trunk or passenger compartment, and/or the use of the clip 32 to secure the cable 26 around a structural element within the vehicle, and back to the cable.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A safety reflector apparatus for a vehicle, the vehicle having a door and a passenger compartment, said safety reflector apparatus comprising:

a panel member constructed of magnetic material permitting said panel member to be adhered to a magnetic surface of the vehicle, said panel member having a front surface, a back surface, and an edge; said panel member front surface at least partially covered with a reflective material; said panel member back surface including an adhesive strip permitting said panel member to be adhered to a nonmagnetic surface of the vehicle; and a length of cable connected to said panel member edge, said cable terminating in an anchor element, so that when said panel member is affixed to the outside of the vehicle, said cable can be passed around the door with said anchor element inside the passenger compartment, effectively locking said panel member to the vehicle, said cable further including a clip element permitting said cable to be looped and secured around a structure in the vehicle and secured to itself.

2. The safety reflector apparatus of claim 1 wherein said panel member is constructed of flexible magnetic sheet material.

3. The safety reflector apparatus of claim 1 wherein said reflective material is in the form of indicia.

4. The safety reflector apparatus of claim 1 wherein said adhesive strip includes a removable covering.

\* \* \* \* \*